United States Patent [19]
Kosinski

[11] 3,743,333
[45] July 3, 1973

[54] ADJUSTABLE CONNECTION FOR A QUICK CHANGE ADAPTER

[75] Inventor: Joseph W. Kosinski, Elmwood Park, Ill.

[73] Assignee: The Bendix Corporation, Southfield, Mich.

[22] Filed: July 21, 1971

[21] Appl. No.: 164,651

[52] U.S. Cl. .................. 287/52.08, 287/62
[51] Int. Cl. ............................. F16d 1/06
[58] Field of Search .................. 287/52.08, 62; 151/24; 85/33; 279/83

[56] References Cited
UNITED STATES PATENTS
3,463,520   8/1969   Turro ........................ 287/52.08
864,989   9/1907   Richares ................. 287/52.08 X

*Primary Examiner*—Andrew V. Kundrat
*Attorney*—John R. Benefiel et al.

[57] ABSTRACT

An adjustable connection arrangement for axially adjusting a threaded toolholder with respect to a quick change adapter to preset the tool with respect to the machine spindle including an adapter nut releasably secured to the quick change adapter and having a bore formed therein in which the OD of the threaded toolholder slidingly fits to insure a minimum runout therebetween. An internally threaded split retaining ring is positioned in an annular groove intermediate the adapter nut bore and disposed to threadedly engage the toolholder, while a set screw carried by the adapter nut is provided to compress the split retaining ring and lock it to the toolholder threads in any adjusted position to thereby create an axial adjustment and locking arrangement between the toolholder and adapter nut without excessive runout.

1 Claim, 4 Drawing Figures

PATENTED JUL 3 1973

3,743,333

INVENTOR
JOSEPH W. KOSINSKI

BY John R. Bonefiel

ATTORNEY

ADJUSTABLE CONNECTION FOR A QUICK CHANGE ADAPTER

BACKGROUND OF THE INVENTION

1. Field of the Invention

This invention concerns axially adjustable connections, and more particularly an adjustable connection arrangement for axially adjusting a toolholder with respect to a machine spindle adapter assembly to provide a preset capability.

2. Description of the Prior Art

Quick change adapters of the type disclosed in U.S. Pat. Nos. 2,860,883 and 2,990,188 utilize an adapter nut releasably located to the rest of the quick change adapter assembly which has a shoulder formed therein abutting the mounting structure (such as the machine spindle) for precision location therewith. The toolholder is received within a bore in the nut with some means of securing these together.

In order to provide a "preset" capability required in typical applications of this device, some arrangement for adjusting the relative axial position of the nut adapter and the toolholder must be provided as well as some means to securely lock these elements together in their adjusted position. Ideally, any such arrangement should be easily adjustable by hand while providing a secure lock and precision location of the connected elements with respect to each other and the mounting structure when in the adjusted state. Preferably, this should be accomplished without involving excessive costs as a result of special or extremely close tolerance machining operations, or a complex configuration.

Prior art arrangements have not met this ideal, an example of which, and typical to these, is the arrangement in which the toolholder adapter is threadedly engaged with the adapter nut so that relative rotation causes axial adjustment thereof to provide the "preset" capability, while the use of a set screw, or a set screw and threaded insert engaging the toolholder threads is relied on to lock the toolholder and adapter nut together in the adjusted position. With this approach either excessive radial and face runout is created upon tightening of the set screw or else extremely close tolerance threads are resorted to, leading to the excessively high fabrication costs since the thread is relied on to locate the adapter nut and toolholder with respect to each other and the unbalanced loading created by the set screw tends to cock or shift one with respect to the other with all but the most precision of thread fits.

Therefore, it is an object of the present invention to provide an adjustable connection particularly useful in this context, which provides an easy axial adjustability between a pair of elements while also providing a secure lock therebetween and a minimum of runout, without involving excessively high thread tolerance or other special, high cost machining operations, or an unduly complicated design.

SUMMARY OF THE INVENTION

This and other objects which will become apparent upon a reading of the following specification and claims are accomplished by providing an internally threaded split retainer ring axially positioned in an annular groove in the adapter nut and threadedly engaging the toolholder in order to provide the adjustable axial positioning, while a set screw carried by the adapter nut and engaging the split retainer ring outer surface provides the secure lock in the adjusted position by compressing it onto the toolholder threads. Runout is controlled by a sliding fit of the OD of the toolholder thread with surfaces of an internal bore in the adapter nut with the surfaces axially spaced on either side of the split retaining ring.

DETAILED DESCRIPTION

In the following detailed description, certain specific terminology will be utilized for the sake of clarity and specific embodiments will be described in order to provide a complete understanding of the invention, but it is to be understood that the invention is not so limited and may be practiced in a variety of forms and embodiments.

Figure 1:
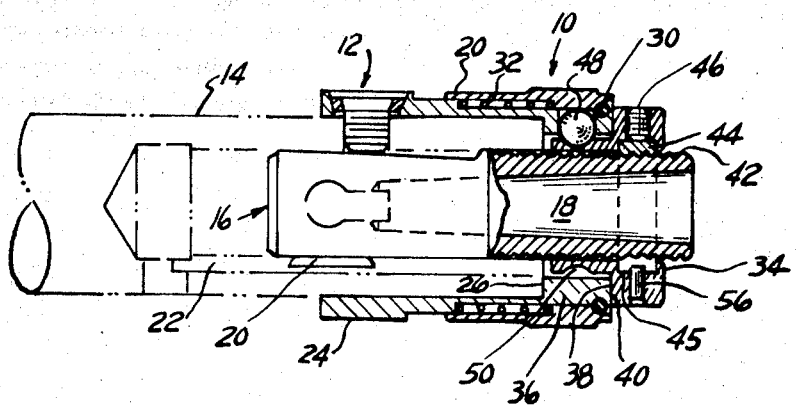
FIG. 1 is a sectional view of a quick change adapter spindle nose assembly incorporating an adjustable connection according to the present invention.

Referring to the drawings, and particularly FIG. 1, a quick change adapter spindle nose assembly 10 is depicted secured by means of an eccentric lock screw 12 to a mounting structure which is depicted as a spindle nose 14 as shown in phantom lines.

A toolholder element 16 adapted to receive a tool or other member in a socket 18 is disposed within the spindle nose 14 so as to be axially movable but rotationally fixed relative thereto by means of a Woodruff key 20 disposed in a slot 22 in the spindle nose 14.

The toolholder 16 is retained therein and axially positioned by means of the quick change adapter spindle nose assembly 10. This assembly includes a sleeve 24 slidably fit over the spindle 14 and secured thereto with the shoulder 26 abutting the spindle end thereof to accurately and securely position the quick change adapter spindle nose assembly 10.

A control sleeve 28 is slidably positioned over the sleeve 24 and biased towards a spring ring stop 30 by means of a compression spring 32 to thus be caused to normally assume the position depicted in FIG. 1.

An adapter nut element 34 is disposed within the end portion 36 of the sleeve 24 and having a shoulder 38 abutting a complementary shoulder 40 formed on the end portion to accurately locate the adapter nut 34 with respect to the sleeve 24 and in turn to the spindle 14.

The toolholder 16 has a threaded front end portion 42, the OD of which is slidably fit into a bore in the adapter nut 34 to be accurately located with respect thereto, and additionally is threadedly engaged with an internally threaded split retaining ring 44 carried by the adapter nut 34 by being disposed in an annular groove 45 so as to prevent relative axial motion therebetween.

Thus, upon relative rotation in either direction between the retaining ring 44 and the toolholder 16, the driving connection created by the threaded engagement will cause axial movement in either direction to be induced to thus provide the preset capability.

Locking means including a set screw 46 is provided which is carried by the adapter nut 34 and engaging the outer surface of the split retainer ring 44 so as to be capable of radially compressing it onto the threaded portion 42 into secure frictional engagement therewith and thus lock the split retainer ring 44 and the adapter nut 34 thereto in any given position, thereby securely positioning the toolholder 16 in any selected preset adjustment.

The adapter nut 34 and the attached toolholder 16 may be quickly released by the arrangement of the balls 48 disposed in the annular groove 50 formed in the end portion 52 of the adapter nut 34 so that in the position shown they securely hold the adapter nut 34 against axial movement since the balls 48 are forced to remain in the groove 50 by the inside surface of the control sleeve 28, but allow rotation thereof to accomplish the preset adjustment.

Upon movement of the control sleeve 28 to the left as viewed in FIG. 1, until the relieved area 52 is positioned above the groove 50, the balls 48 are allowed to move up into the relieved area 52 and out of the groove 50 to thus release the adapter nut 34 and attached toolholder 16 without disturbing the preset adjustment to allow another such assembly to be quickly inserted.

Figure 2:
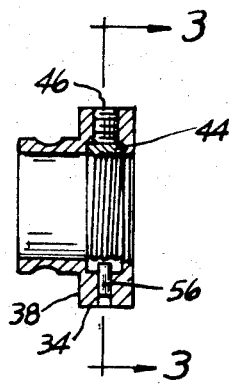
FIG. 2 is a sectional view of the adapter nut assembly shown in FIG. 1.
Figure 3:
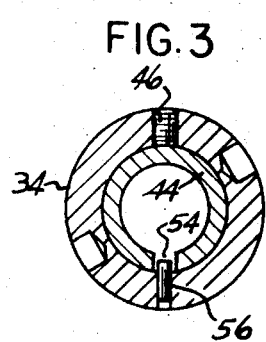
FIG. 3 is a view of the section 3—3 in FIG. 2.
Figure 4:
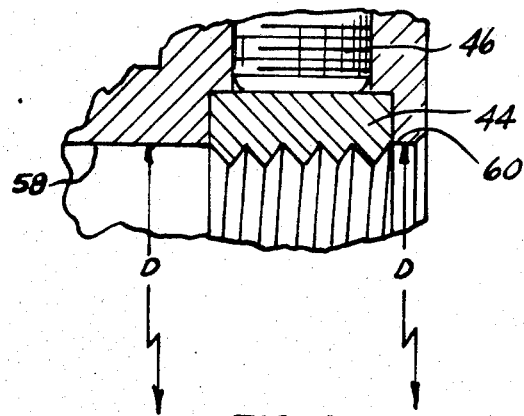
FIG. 4 is an enlarged detail view of a portion of the adapter nut assembly shown in section in FIG. 2.

In order to better understand the adjustable connection of the present invention, the adapter nut 34 and the split retaining ring 44 are shown apart from the rest of the assembly in FIGS. 2–4.

As seen in FIG. 3, the split retaining ring 44 is split at 54 in order to provide the radial compressibility necessary to lock it to the toolholder 16 and to facilitate assembly into the annular groove 45 by compression thereof to pass through the bore diameter D (FIG. 2). In connection with this latter function, it is noted that the split retaining ring 44 should be designed so that in carrying out the assembly, no appreciable set takes place so that the ring is accurately positioned within the annular groove 45, and so that it will properly grip the toolholder threaded portion when compressed by the set screw 46. For small sizes on the order of ½ – ¾ inch, beryllium copper has given good results as the necessary compression can be accomplished at much lower stress levels due to the relatively low modulus of elasticity of this material. For greater diameters, steel alloys can be used successfully.

The relative width of the annular groove 45 and the split retaining ring 44 should be carefully controlled to eliminate possible end play occurring as a result of looseness between these parts.

A roll pin 56 is also provided disposed in the adapter nut 34 and extending into the split opening of split retaining ring 44 to insure its rotation with the adapter nut 34 when the set screw 46 is loosened to allow axial adjustment by rotation of the adapter nut 34.

As best seen in FIG. 4, the split retaining ring 44 is disposed intermediate a pair of bore surfaces 58, 60, both precision ground to the diameter D which is selected to be that of the OD of externally threaded portion 42 of the toolholder 16. These surfaces act as the locating surfaces and as the bore D and the OD of the externally threaded portion 42 may be precision ground with comparative ease as compared with interfitting threads, a precision locating of these elements is obtained without resort to expensive machining processes.

Furthermore, the position of the guide surfaces 58 and 60 stradling the retainer ring has been found to eliminate a cocking tendency that may occur upon tightening of the set screw 46 so that the assembly is unaffected by the locking operation after preset adjustment has been carried out.

From the above description it can be appreciated that an adjustable connection has been provided which includes an arrangement for producing a threaded axial adjustment between two elements, but which does not rely on the fit between threaded portions of these elements to control runout, which does not involve difficult and expensive machining operations or complex design, and which is particularly advantageous in the context of a quick change adapter for toolholders.

Further, the toolholder threads are gripped by action of the split retaining ring rather than a localized bearing contact reducing the cocking tendency and thread wear as a result.

Many variations are of course possible within the scope of the invention.

What is claimed is:

1. An adjustable connection comprising a threaded shaft element and a second collar element mounted thereon and having an internal bore formed therein and allowing axial adjustment therebetween;

means locating said first and second elements with respect to each other including internal bore surface portions on either side of an annular recess formed in said bore with respect to the said external thread on said first element to thereby control runout between said first and second elements by means of said sliding fit between said internal bore surface portions and said external thread on said first element;

a split retaining ring carried by said second element in said annular recess and formed with a complementary thread in threaded engagement with said external thread of said first element;

a pin carried by said second element and extending radially between said split of said split retaining ring to prevent relative rotation between said split retaining ring and said second element;

adjustable means carried by said second element and selectively operable to compress said retaining ring against said external thread of said first element to thereby prevent movement of said split retaining ring with respect to said first and second elements whereby said first and second elements may be selectively secured together in any adjusted position.

* * * * *